US012659949B2

(12) United States Patent
Niu et al.

(10) Patent No.: US 12,659,949 B2
(45) Date of Patent: Jun. 16, 2026

(54) TECHNOLOGIES FOR UPLINK GAP TRIGGERING AND OPERATION

(71) Applicant: Apple Inc., Cupertino, CA (US)

(72) Inventors: Huaning Niu, San Jose, CA (US);
Qiming Li, Beijing (CN); **Dawei
Zhang, Saratoga, CA (US); Jie Cui**,
San Jose, CA (US); Manasa Raghavan,
Sunnyvale, CA (US); **Sharad
Sambhwani**, Cupertino, CA (US);
Xiang Chen, Campbell, CA (US); **Yang
Tang**, San Jose, CA (US)

(73) Assignee: Apple Inc., Cupertino, CA (US)

( * ) Notice: Subject to any disclaimer, the term of this
patent is extended or adjusted under 35
U.S.C. 154(b) by 468 days.

(21) Appl. No.: 17/442,482

(22) PCT Filed: May 4, 2021

(86) PCT No.: PCT/CN2021/091807
§ 371 (c)(1),
(2) Date: Sep. 23, 2021

(87) PCT Pub. No.: WO2022/232962
PCT Pub. Date: Nov. 10, 2022

(65) Prior Publication Data
US 2023/0362920 A1 Nov. 9, 2023

(51) Int. Cl.
*H04W 4/00* (2018.01)
*H04L 1/1812* (2023.01)
(Continued)

(52) U.S. Cl.
CPC ....... *H04W 72/1268* (2013.01); *H04L 1/1812*
(2013.01); *H04W 72/232* (2023.01)

(58) Field of Classification Search
CPC ........... H04W 72/1268; H04W 72/232; H04W
72/23; H04W 52/367; H04W 28/0278;
(Continued)

(56) References Cited

U.S. PATENT DOCUMENTS

2007/0213077 A1* 9/2007 Mian ..................... H04L 51/066
455/466
2012/0051304 A1 3/2012 Han et al.
(Continued)

FOREIGN PATENT DOCUMENTS

CN 101895901 11/2010
CN 106416350 2/2017
(Continued)

OTHER PUBLICATIONS

Discussion on Rel-17 FR2 Calibration Gap, OPPO, 3GPP TSG-
RAN WG4 Meeting #97e, R4-2015349, Nov. 13, 2020, 3 pages.
(Continued)

*Primary Examiner* — Edan Orgad
*Assistant Examiner* — Hidayat Dabiri
(74) *Attorney, Agent, or Firm* — Kilpatrick Townsend &
Stockton LLP

(57) ABSTRACT

The present application relates to devices and components
including apparatus, systems, and methods for triggering
and using uplink gaps in cellular networks. A method of an
embodiment comprises: transmitting, to a base station, an
indication of an uplink (UL) gap capability or preference of
the UE for body proximity sensing (BPS) or transceiver
calibration; activating a UL gap configuration based on an
activation command received from a network; and perform-
ing operations for BPS or transceiver calibration within a
UL gap defined by the UL gap configuration.

28 Claims, 10 Drawing Sheets

(51) Int. Cl.
    *H04W 72/1268*     (2023.01)
    *H04W 72/232*     (2023.01)

(58) Field of Classification Search
    CPC .......................... H04W 72/0446; H04W 72/21;
             H04L 1/1812; H04L 1/1671; H04B
             17/354; H04B 17/18; H04B 17/15; H04B
                 17/19; H04B 17/14; H04B 17/11
    See application file for complete search history.

(56) References Cited

U.S. PATENT DOCUMENTS

| | | | |
|---|---|---|---|
| 2013/0039287 A1* | 2/2013 | Rayavarapu .......... | H04W 76/19 |
| | | | 370/329 |
| 2014/0086116 A1 | 3/2014 | Seo et al. | |
| 2014/0341192 A1* | 11/2014 | Venkob ............. | H04W 52/0216 |
| | | | 370/336 |
| 2015/0245235 A1 | 8/2015 | Tang et al. | |
| 2017/0230815 A1 | 8/2017 | Yasukawa et al. | |
| 2017/0280469 A1* | 9/2017 | Park .................... | H04W 72/542 |
| 2017/0339712 A1* | 11/2017 | Rico Alvarino ...... | H04W 72/23 |
| 2019/0021017 A1 | 1/2019 | Nagaraja et al. | |
| 2019/0150170 A1 | 5/2019 | Park et al. | |
| 2019/0222326 A1 | 7/2019 | Dunworth et al. | |
| 2020/0112350 A1 | 4/2020 | Yang et al. | |
| 2020/0314896 A1 | 10/2020 | Koorapaty et al. | |
| 2020/0336227 A1* | 10/2020 | Takeda ................. | H04B 17/327 |
| 2020/0351818 A1 | 11/2020 | Park et al. | |
| 2020/0383095 A1* | 12/2020 | Moon ...................... | H04L 5/001 |
| 2020/0404671 A1 | 12/2020 | Karaki et al. | |
| 2021/0126762 A1* | 4/2021 | Suzuki .................. | H04L 5/0098 |
| 2021/0135770 A1 | 5/2021 | Schober et al. | |
| 2021/0298038 A1* | 9/2021 | Kang ................... | H04L 5/0057 |
| 2021/0368374 A1* | 11/2021 | Cheng ................. | H04W 72/542 |
| 2021/0400513 A1 | 12/2021 | Raghavan et al. | |
| 2021/0410024 A1 | 12/2021 | Tang et al. | |
| 2022/0014955 A1* | 1/2022 | Yang ..................... | H04W 76/27 |
| 2022/0057474 A1* | 2/2022 | Duan ................... | H04W 4/029 |
| 2022/0060923 A1* | 2/2022 | Zheng .................. | H04W 24/10 |
| 2022/0272672 A1* | 8/2022 | Zhu ........................ | H04L 5/0053 |
| 2022/0330184 A1 | 10/2022 | Lei | |
| 2022/0330312 A1* | 10/2022 | Zhou .................... | H04W 68/005 |
| 2022/0337278 A1* | 10/2022 | Caporal Del Barrio ..................... | |
| | | | H04W 36/0072 |
| 2022/0353888 A1* | 11/2022 | Sanders ................ | H04L 5/1469 |
| 2022/0399926 A1 | 12/2022 | Flordelis et al. | |
| 2023/0038050 A1 | 2/2023 | Si et al. | |
| 2023/0100583 A1 | 3/2023 | Niu et al. | |
| 2023/0156788 A1 | 5/2023 | Lunttila et al. | |
| 2023/0217322 A1 | 7/2023 | Peng et al. | |
| 2023/0284286 A1* | 9/2023 | Karimidehkordi ........................... | |
| | | | H04W 74/0841 |
| | | | 370/329 |
| 2023/0328684 A1 | 10/2023 | Wang et al. | |
| 2023/0362765 A1* | 11/2023 | Zheng ............... | H04W 36/0088 |
| 2023/0396984 A1* | 12/2023 | Shrivastava .......... | H04W 76/27 |
| 2024/0015708 A1* | 1/2024 | Oguma ................. | H04W 88/02 |
| 2024/0179643 A1* | 5/2024 | Enescu .............. | H04W 52/283 |
| 2024/0215014 A1* | 6/2024 | Niu .................... | H04W 72/1268 |
| 2024/0244533 A1* | 7/2024 | Niu ......................... | H04W 8/24 |
| 2025/0301530 A1* | 9/2025 | Kim ...................... | H04W 24/02 |

FOREIGN PATENT DOCUMENTS

| | | |
|---|---|---|
| CN | 106576332 | 4/2017 |
| CN | 109348740 | 2/2019 |
| CN | 110870349 | 3/2020 |
| EP | 2858405 | 4/2015 |
| EP | 3958604 A1 | 2/2022 |
| WO | 2020122617 A1 | 6/2020 |
| WO | 2020147128 | 7/2020 |
| WO | 2020224575 A1 | 11/2020 |

OTHER PUBLICATIONS

Discussion on UL Gaps for Self-Calibration and Monitoring, Apple, 3GPP TSG-RAN WG4 Meeting #97-e, R4-2014218, Nov. 13, 2020, 19 pages.

Motivation on UL Gap for Self-Calibration and Monitoring, Apple, 3GPP TSG RAN Meeting #89e, RP-201603, Sep. 18, 2020, 6 pages.

UL Gaps for Tx Power Management, Apple, 3GPP TSG-RAN WG4 Meeting #98-e, R4-2100218, Jan. 25-Feb. 5, 2021, 7 pages.

International Patent Application No. PCT/CN2021/091807, International Search Report and Written Opinion, Mailed on Jan. 26, 2022, 10 pages.

New WID on NR RF Enhancements for FR2, Nokia, Nokia Shanghai Bell, 3GPP TSG RAN Meeting #89, RP-202042, Sep. 14-18, 2020, 4 pages.

3rd Generation Partnership Project; Technical Specification Group Radio Access Network; NR; User Equipment (UE) radio transmission and reception; Part 3: Range 1 and Range 2 Interworking operation with other radios (Release 17), 3GPP TS 38.101-3 V17.1.0, Mar. 2021, 716 pages.

3rd Generation Partnership Project; Technical Specification Group Radio Access Network; NR; Requirements for support of radio resource management (Release 17), 3GPP TS 38.133 V17.1.0, Mar. 2021, 2172 pages.

3rd Generation Partnership Project; Technical Specification Group Radio Access Network; NR; Multiplexing and channel coding (Release 16), 3GPP TS 38.212 V16.5.0, Mar. 2021, 152 pages.

3rd Generation Partnership Project; Technical Specification Group Radio Access Network; NR; Medium Access Control (MAC) protocol specification (Release 16), 3GPP TS 38.321 V16.4.0, Mar. 2021, 157 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

3rd Generation Partnership Project, Technical Specification Group Radio Access Network, NR, Multiplexing and Channel Coding (Release 16), 3GPP TS 38.212 V16.5.0, Mar. 30, 2021, 152 pages.

European Patent Application No. 21901689.6, Extended European Search Report, Jun. 21, 2023, 3 pages.

Technical Specification entitled, "3rd Generation Partnership Project; Technical Specification Group Radio Access Network; NR; Physical layer procedures for control (Release 16)," 3GPP TS 38.213 V16.5.0 (Mar. 2021) in 183 pages.

International Preliminary Report on Patentability issued in PCT Application No. PCT/CN2021/091807, dated Nov. 16, 2023 in 5 pages.

Discussion summary for 3GPP TSG-RAN WG4 Meeting # 98-bis-e, Apple, Apr. 20-21, 2021, 21 pages.

Meeting document entitled "Consideration on FR2 UL Gap for Self-Calibration," Ntt Docomo, Inc, 3rd Generation Partnership Project Technical Specification Group-Radio Access Network Working Group 4 Meeting #98-bis-e, R4-2107034, Source: NTT Docomo, Inc.; Agenda Item: 8.3.4.1 in 5 pages.

Office Action issued in European Application No. EP21901689.6, dated Nov. 7, 2024 in 7 pages.

Office Action issued in Korea Application No. KR10-2022-7023397, dated Oct. 29, 2024 in 9 pages.

First Examination Report issued in India Application No. IN202217037690, dated Jan. 22, 2025 in 5 pages.

Technical Specification, entitled "3GPP TS 38.133 V17.0.0", 3rd Generation Partnership Project; Technical Specification Group Radio Access Network; NR; Requirements for Support of Radio Resource Management (Release 17), Dec. 2020 in 1812 pages.

Technical Specification, entitled "3GPP TS 38.331 V16.3.1", 3rd Generation Partnership Project; Technical Specification Group Radio Access Network; NR; Radio Resource Control (RRC) Protocol Specification (Release 16), Jan. 2021 in 932 pages.

Discussion document, entitled "Assumptions for Study on FR2 UL Gaps for Self-Calibration and Monitoring", 3GPP TSG-RAN WG4 Meeting # 97-e, R4-2014516, Nov. 2-13, 2020 in 3 pages.

Discussion document, entitled "FR2 RF Work Area in Rel-17", Moderator (Nokia), 3GPP TSG-RAN Meeting # 89-e, RP-201609, Sep. 14-18, 2020 in 10 pages.

(56)     References Cited

OTHER PUBLICATIONS

Discussion document, entitled "PA Calibration Gaps for FR2 UEs", Nokia, Nokia Shanghai Bell, 3GPP TSG-RAN WG4 Meeting #87, R4-1807678, May 25, 2018 in 2 pages.

Final Office Action issued in U.S. Appl. No. 17/441,655, dated Jun. 5, 2024 in 15 pages.

Non-Final Office Action issued in U.S. Appl. No. 17/441,655, dated Oct. 1, 2024 in 14 pages.

Non-Final Office Action issued in U.S. Appl. No. 17/441,655, dated Nov. 24, 2023 in 15 pages.

Extended European Search Report issued in European Application No. EP21918367.0, dated Feb. 13, 2024 in 11 pages.

International Preliminary Report on Patentability issued in PCT Application No. PCT/CN2021/071773, dated Jul. 27, 2023 in 6 pages.

International Search Report and Written Opinion issued in PCT Application No. PCT/CN2021/071773, dated Oct. 12, 2021 in 9 pages.

Discussion on UL Gap for Self-calibration and Monitoring, 3Generation Partnership Project Technical Specification Group-Radio Access Network Working Group4 Meeting #98bis-e, R4-2104920, Apr. 12-20, 2021, 4 pages.

UL Cal Gap Types and Applicability, 3Generation Partnership Project Technical Specification Group-Radio Access Network Working Group4 Meeting #98-Bis-e, R4-2107280, Apr. 2021, 2 pages.

China Patent Application No. 202180006214.8, Office Action, Jul. 10, 2025, 26 pages.

Korea Patent Application No. 10-2022-7023397, Notice of Decision to Grant, Jul. 1, 2025, 3 pages.

U.S. Appl. No. 17/441,655, Final Office Action, Apr. 18, 2025, 15 pages.

U.S. Appl. No. 17/441,655, Notice of Allowance, Sep. 17, 2025, 11 pages.

China Patent Application No. 202180090681.3, Office Action, Jan. 21, 2026, 12 pages.

* cited by examiner

108

104

100

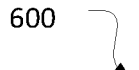

600

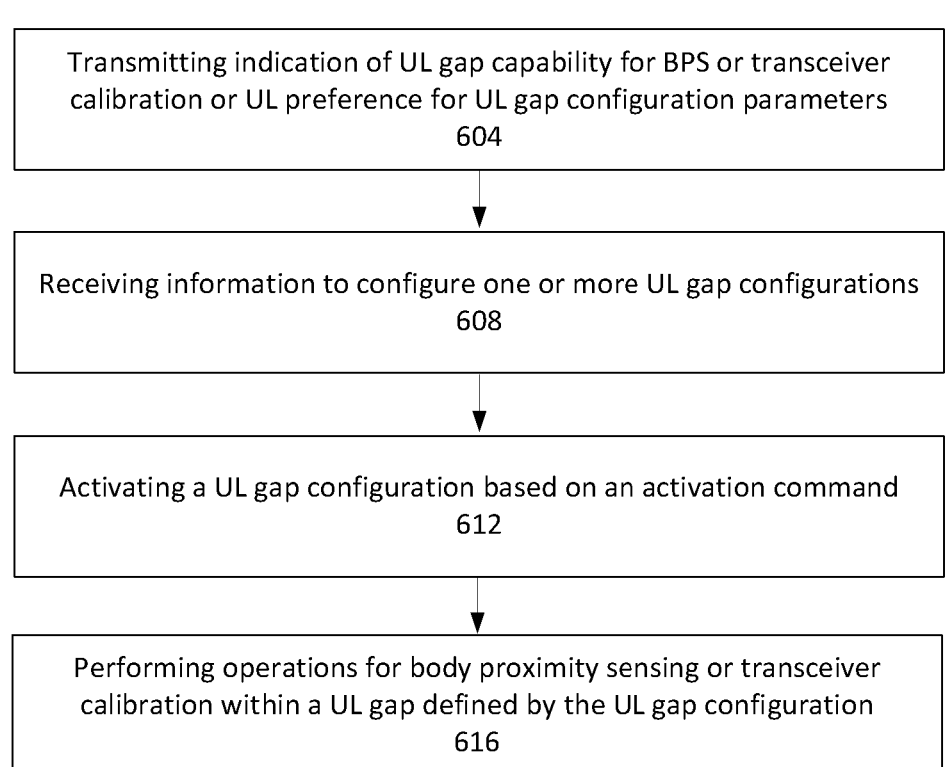

| Transmitting indication of UL gap capability for BPS or transceiver calibration or UL preference for UL gap configuration parameters 604 |
| Receiving information to configure one or more UL gap configurations 608 |
| Activating a UL gap configuration based on an activation command 612 |
| Performing operations for body proximity sensing or transceiver calibration within a UL gap defined by the UL gap configuration 616 |

Receiving indication of UL gap capability for BPS or transceiver calibration operations or UE preference for UL gap configuration parameters
704

Transmitting information to configure one or more UL gap configurations
708

Transmitting an activation command to activate a UL gap configuration of the one or more UL gap configurations
712

800

Detecting a trigger
804

Transmitting a UL gap activation request based on trigger
808

Receiving an activation command
812

Activating a UL gap configuration based on the activation command
816

TECHNOLOGIES FOR UPLINK GAP TRIGGERING AND OPERATION

CROSS-REFERENCE TO RELATED APPLICATIONS

This application is the U.S. National Phase of PCT/CN2021/091807 filed May 4, 2021, the disclosure of which is herein incorporated by reference in its entirety for all purposes.

BACKGROUND

Third Generation Partnership Project (3GPP) Fifth Generation (5G) New Radio (NR) provides for communication between user equipment (UE) and a base station, for example, a next generation Node B (gNB). Operation and coordination of these network devices is defined through Technical Specifications (TSs) periodically released by 3GPP.

BRIEF DESCRIPTION OF THE DRAWINGS

FIG. 6 illustrates an operational flow/algorithmic structure in accordance with some embodiments.

DETAILED DESCRIPTION

Figure 1:
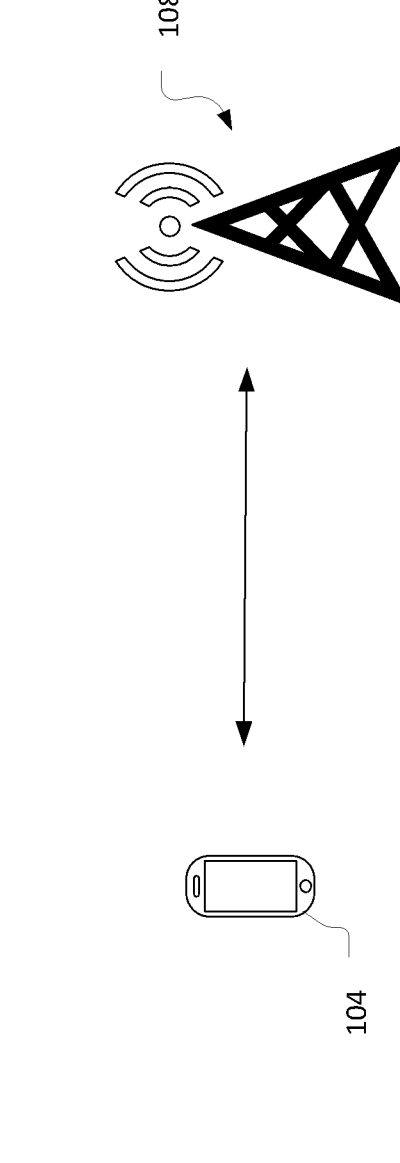
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware element(s). A "virtualized resource" may refer to compute, storage, or network resources provided by virtualization infrastructure to an application, device, or system. The term "network resource" or "communication resource" may refer to resources that are accessible or utilized by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a base station 108. The base station 108 may provide one or more wireless access cells, for example, 3GPP NR cells, through which the UE 104 may communicate with the base station 108. In some aspects, the base station 108 is a gNB that provides 3GPP New Radio (NR) cell. The air interfaces over which the UE 104 and base station 108 communicate may be compatible with 3GPP TSs such as those that define 5G NR system standards and may occupy frequency bands in Frequency Range 1 (FR1) (e.g., below 7.225 GHz), Frequency Range 2 (FR2) (e.g., 24.250 GHz and above, also called mmWave), or higher frequency bands (e.g., between 52.6 GHz and 71 GHz or 114.25 GHz).

It may be desired to enhance coverage, signal quality, or UE performance in the frequency ranges above FR1. For example, it may be desired to improve power efficiency or overall system throughput. Some FR2 enhancements may involve operations that should be performed during run-time but may not be compatible with transmission or reception of data or control signals. Due to unavoidable hardware sharing, various identified FR2 enhancements may rely on and benefit from a periodic uplink (UL) gap, during which time the UE can perform these operations (for example, over the air or through an internal loop) without interrupting transmission/reception. Examples of these operations include: power amplifier (PA) efficiency and power consumption operations; transceiver calibration operations; and UL Tx power management operations. Other self-calibration or monitoring operations are not precluded.

PA efficiency and power consumption operations may be performed to calibrate a PA. These operations may include performing periodic measurements of one or more characteristics of the PA including, for example, gain and linearity.

Transceiver calibration operations may be performed to compensate for operational performance variations due to, for example, temperature fluctuations. It may be desired to perform transceiver calibration periodically at runtime in order to compensate for transceiver impairments. A calibration network may also help to maximize beamforming gain of the antenna array, thereby improving FR2 system performance. Typical usage cases of transceiver calibration may include any one or more of PA calibration (Tx), I/Q imbalance (Tx/Rx), local oscillator (LO) leakage (Tx) and DC offset (Rx).

UL Tx power management operations may allow a UE to adaptively and efficiently adjust its output power to improve UL coverage or throughput while maintaining compliance with regulatory requirements. Transmit power management may benefit from periodic monitoring of information from the surrounding environment (e.g., body proximity).

At least some of the aforementioned self-calibration and monitoring mechanisms may be generalized as a basic scheme in which the UE 104 sends and receives a calibration signal, either over the air or through another internal loop between transmit (Tx) and receive (Rx) hardware. Since the hardware used for UL transmission is partially shared by self-calibration and monitoring, UL transmission may be interrupted momentarily by such an operation. It may be desired to minimize such disruption by providing a preconfigured UL gap, during which time the UE can perform operations for FR2 RF enhancement, such as calibration and/or measurement (e.g., transceiver calibration and Tx power management). While some embodiments are described as improvements to operation in FR2, they may also be applied to other frequency ranges including ranges above FR2.

The UE 104 may be provided with an UL gap configuration that specifies values such as gap length, gap periodicity, and/or gap location (for example, offset). An offset may define an exact location within each periodicity. For example, when periodicity (ULgap_periodicity) and offset (ULgapStartOffset) are defined by milliseconds (ms), the exact subframe location of the start of a UL gap can be calculated as the subframe that meets the following condition: (SFN*10)+subframe number] mod (ULgap_periodicity)==(ULgapStartOffset) mod (ULgap_periodicity), where SFN is a system frame number.

If periodicity and offset are defined in slots, depending on subcarrier spacing and assuming 120 KHz SCS, the UL gap may start at a slot index that meets the following condition: ((SFN*10)+subframe number)*8+(slotIndex within subframe)] mod (ULgap_periodicity)==(ULgapStartOffset) mod (ULgap_periodicity)

The UL gap configuration may be UE-specific and may be provided by the base station 108 using radio resource control (RRC) signaling or medium access control-control elements (MAC-CEs)).

Figure 2:
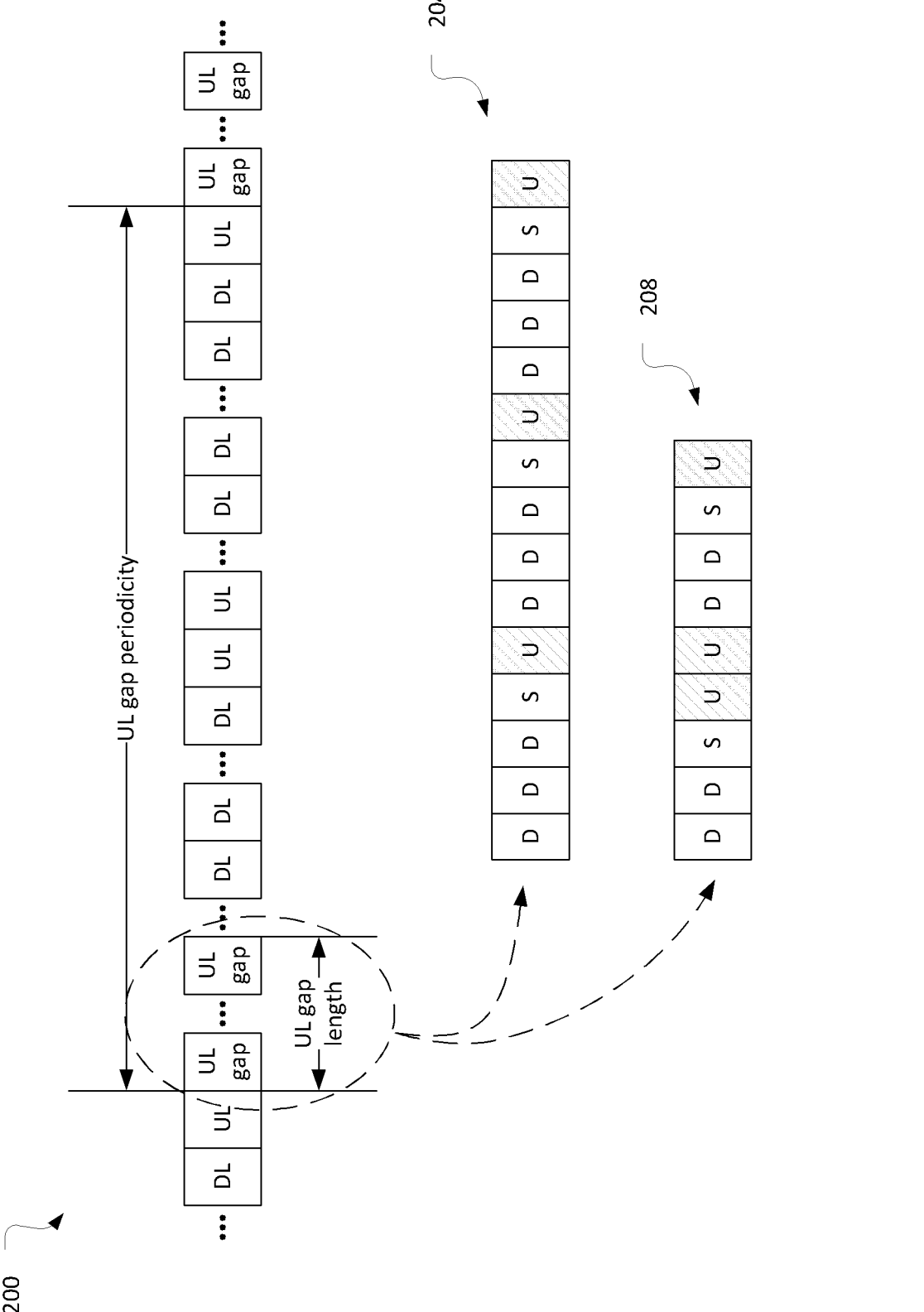
FIG. 2 shows an example of a DL/UL schedule that illustrates parameters of uplink gap periodicity and length in accordance with some embodiments.

FIG. 2 shows an example of a DL/UL schedule 200 that illustrates the parameters of UL gap periodicity and UL gap length (duration) in the context of a time sequence of DL/UL periods in accordance with some embodiments.

The UL gap length may be defined as a number of consecutive UL slots. Based on the different DL/UL configuration, the UL slots may be continuous or discontinuous. Consider, for example, that a UL gap length is defined as three consecutive UL slots. In UL gap sequence 208, which includes a DDDSU DL/UL configuration, fifteen slots may be included in the UL gap to accommodate the three consecutive UL slots (shown with diagonal cross hatching). In UL gap sequence 212, which includes a DDSUU configuration, nine slots may be included in the UL gap to accommodate the three consecutive UL slots (shown with diagonal cross hatching).

In some embodiments, the UL gap lengths may be defined as 1, 2, 4, or 8 consecutive UL slots, and the gap periodicity may be 20, 40, 80, or 160 ms.

To reduce the impact on UL scheduling and throughput performance, it may be desired to impose one or more limits on the parameters of the UL gap or on operation of the UE 104 during the UL gap. In one example, it may be desired to maintain the UL gap length below a certain percentage X (for example, less than, or not more than, X %) of the slot length. In another example, output power of the UE 104 during an UL gap may be restricted. For example, the UE 104 may be restricted from transmitting anything over the air during the UL gap, or a maximum related output power of the UE 104 during the UL gap may be limited by a value Y, which may be indicated in, for example, dBm/MHz. To avoid a UE-coexistence issue, it may be desired to take spurious emission and UE co-existence requirements as specified in 3GPP TS 38.101-3 v16.5.0 (2020-11) as the reference.

Two different types of UL gaps may be used. A first type (Type 1) of UL gap may be without UL grant and a second type (Type 2) of UL gap may be with a UL grant. The type 2 UL gap may be used for a case in which radiated power is to be emitted over the air during the UL gap. Examples of operations to be performed within a type 2 UL gap may include PA calibration, measurement of LO leakage, or measurement of DC offset. Measurement of LO leakage or DC offset may be cheaper with over-the-air emission than without. A type 1 UL gap may be used for a case in which no over-the-air emission by the UE is to occur during the UL gap (for example, calibration through an internal loop). Examples of operations to be performed within a gap without UL grant may include measurement of LO leakage or DC offset (tends to be a more expensive solution than with over-the-air emission) and obtaining measurements for body proximity sensing (BPS) (for example, for Tx power management or beam management).

As described herein, a UL gap for BPS may have a large benefit when the UE 104 is in a cell edge or includes a relatively large amount of UL traffic. The UL gap may be dynamically activated or deactivated to reduce the network overhead, scheduling restriction, etc.

Various embodiments describe dynamically activating/deactivating a type 1 UL gap. The network, through base station 108, for example, may activate/deactivate the type 1 UL gap using MAC CE or through DCI triggering. Further, in some embodiments, the UE 104 may detect an event that triggers a request for type 1 UL gap. Multiple UL gap pattern configurations may be tailored to different usage cases. Embodiments also describe fallback behavior for the UE 104 in the event that UL gaps are not available.

Figure 3:
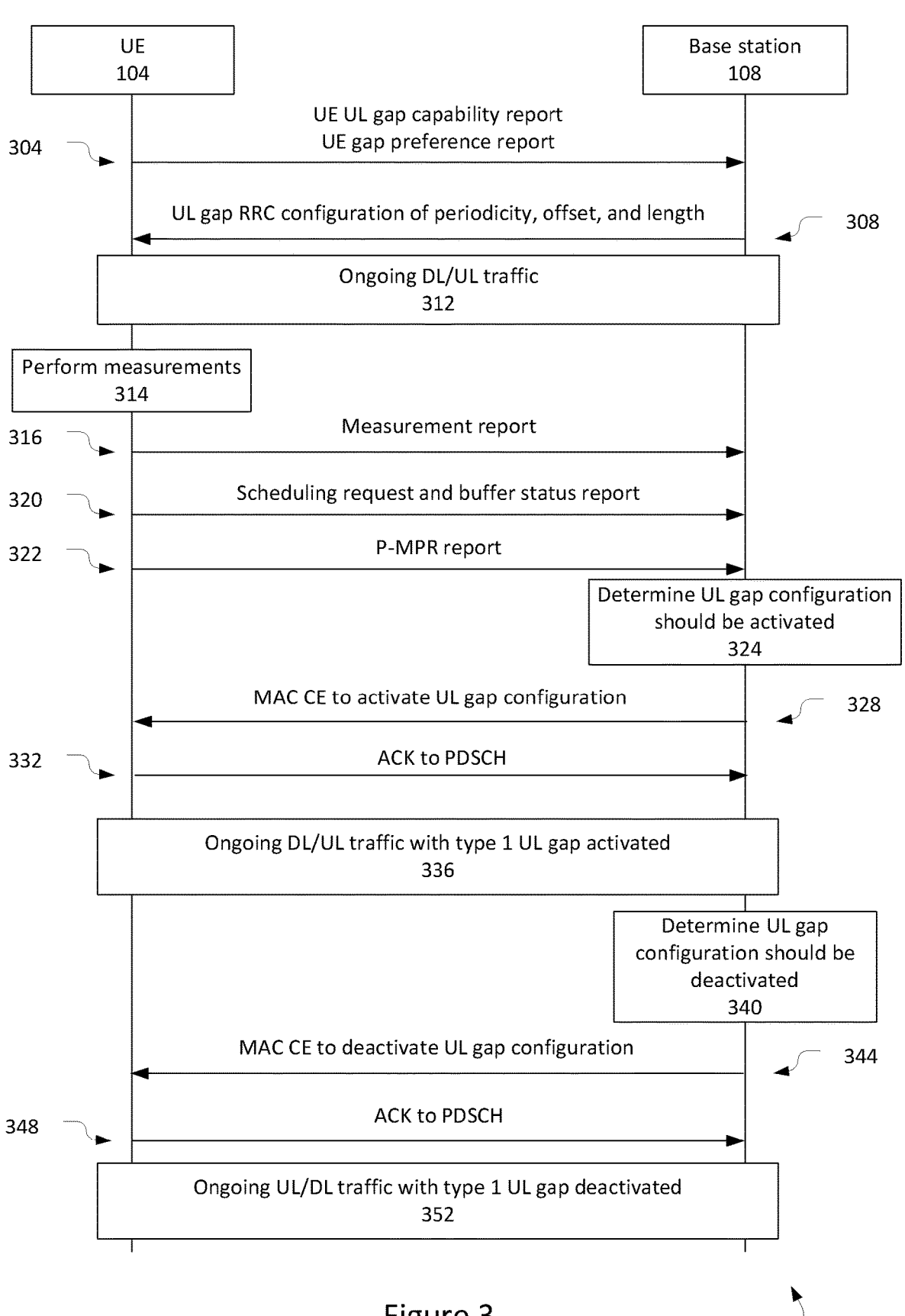
FIG. 3 is a message diagram that illustrates a network triggering activation of an uplink gap configuration in accordance with some embodiments.

FIG. 3 is a message diagram 300 between the UE 104 and the base station 108 that illustrates the network triggering activation of a UL gap configuration using MAC CE in accordance with some embodiments.

At 304, the UE 104 may transmit a UL gap capability report and a gap preference report. These reports may be included in one message or a plurality of messages.

The UL gap capability report may provide an indication of capabilities of the UE 104 with respect to performing BPS or transceiver calibration within an UL gap. For example, the UL gap capability report may indicate whether the UE 104 is capable of performing a BPS/transceiver calibration operations within a UL gap. In some embodiments, the UE capability may be per gap type. For example, the UE may provide capability information for BPS and transceiver calibration for a type 1 gap. In some embodiments, the UE capability can be per use case. For example, the UE may provide capability information for BPS or for transceiver calibration.

The UE gap preference report may include an indication of parameters that are preferred for a UL gap configuration. These parameters may include gap periodicity, length, or gap type. The gap type may be a type 1 gap, a type 2 gap, an autonomous gap in which the UE selects a gap on its own initiative to perform the operations, or some combination of these.

At 308, the base station 108 may provide the UE 104 with configuration information for one or more UL gap configurations. The configuration information may be provided by RRC signaling and include an RRC information element that defines a periodicity, offset, and length associated with the UL gap configuration.

At 312, the UE 104 and the base station 108 may engage in ongoing DL/UL traffic. Traffic may be exchanged without consideration of an uplink gap, given that no UL gap configurations are activated at this time.

At 314, the UE 104 may perform measurements and, at 316, may transmit a report that includes results of the measurements to the base station 108. The measurements may be periodic, semi-persistent, or aperiodic layer 1 (L1) or layer 3 (L3) reference signal receive power (RSRP) or reference signal receive quality (RSRP) measurements.

At 320, the UE 104 may transmit a scheduling request and buffer status report (BSR) to the base station 108. The scheduling request may request allocation of resources to the UE 104 for the purposes of transmitting uplink traffic. The BSR may provide an indication of an amount of uplink traffic the UE 104 currently has to transmit.

At 322, the UE 104 may transmit a power management-maximum power reduction (P-MPR) report. As described below, the P-MPR report may be part of an UL power control report and may provide information related to managing uplink transmit power at the UE 104.

While certain operations are shown at specific times in FIG. 3, it will be understood that they may performed at additional/alternative times. For example, the ongoing DL/UL traffic 312, perform measurements 314, measurement report 316, and scheduling request and buffer status report 320 may be done at times other than those specifically shown.

At 324, the base station 108 may determine that a UL gap should be activated. In some embodiments, the base station 108 may determine that the UL gap configuration should be activated for BPS measurement based on detecting a cell edge condition, a traffic condition, or a P-MPR condition with respect to the UE 104.

The base station 108 may detect a cell-edge condition based on the L1/L3 RSRP or the L1/L3 RSRQ results transmitted in the measurement report 316. In general, when the measurement results indicate lower values of RSRP/RSRQ, the UE 104 may be located far away from the base station 108, for example, at the cell edge. While at the cell edge, the UE 104 may want to use focused beams with a relatively high UL transmit power. To enable this operation, the UE 104 may need to perform BPS to ensure that it is using acceptable transmit power and direction.

The base station 108 may detect a UE traffic condition based on the BSR. This traffic condition may indicate that the UE 104 has a relatively large amount of UL traffic to transmit. Thus, activating the UL gap configuration may facilitate the efficient delivery of the UL traffic. In some embodiments, if the BSR is above a predetermined threshold, the UE traffic condition, which may be a high-traffic condition, may be present. The predetermined threshold may be statically defined by 3GPP TS or dynamically configured by, for the example, the base station 108.

In yet another example, the base station 108 may determine that the UE supports power management-maximum power reduction (P-MPR) reporting to ensure maximum permissible exposure (MPE) is not exceeded. In some embodiments, this UE capability may be provided to the base station 108 in a capability report (for example, such as that transmitted at 304). This capability may be indicated by MAC parameter tdd-MPE-P-MPR-Reporting. If the base station 108 detects that the UE 104 has determined that P-MPR is needed to meet MPE, the base station 108 may activate the UL gap configuration to facilitate the power management operations.

The P-MPR report is dynamic report that is part of UL power control report. A UE without BPS may not know whether there is a target nearby or not and may need to apply P-MPR based on output effective radiated power (EIRP) and UL duty cycle in order to meet MPE regulation requirement. Therefore, this P-MPR report is implicitly related to UL traffic and peak EIRP as previous condition. When UL gap is configured, then the UE can determine whether target is nearby or not, instead of always assume worst case that there is a target.

At 328, the base station 108 may transmit a MAC CE to the UE 104 to activate the UL gap configuration. The MAC CE may include an activation command and may be transmitted in a PDSCH transmission. In some embodiments, if more than one UL gap configuration was provided at 308, the MAC CE may be capable of activating a plurality of UL gap configurations at 328.

The UE 104 may decode the PDSCH transmission to obtain the activation command in the MAC CE. At 332, the UE 104 may transmit an acknowledgment to the PDSCH transmission. This may provide the base station 108 with an indication that the activation command has been successfully received by the UE 104.

The UL gap configuration may be activated until the UE 104 receives a deactivation command. Therefore, the UE 104 and the base station 108 may engage in ongoing DL/UL traffic with the type 1 UL gap configuration activated at 336. For example, the activated UL gap configuration may provide UL gaps with a periodicity and length as described with respect to FIG. 2.

At 340, the base station 108 may determine that the UL gap configuration should be deactivated. The base station 108 may determine that the UL gap configuration should be deactivated if, for example, the triggering condition detected by the base station 108 at 324 is no longer present. For example, the base station 108 may determine that the UL gap configuration should be deactivated if it detects that a cell-edge condition is no longer present (based on updated L1/L3 RSRP/RSRQ values) or the UE traffic condition is no longer present based on an updated BSR.

After determining that the UL gap configuration should be deactivated at 340, the base station 108 may transmit a MAC CE to the UE 104 to deactivate the UL gap configuration at 344. The MAC CE may include a deactivation command and may be transmitted in a PDSCH transmission. In some embodiments, the base station 108 may transmit the deactivation command in a DCI.

The UE 104 may decode the PDSCH transmission to obtain the deactivation command from the MAC CE. At 348, the UE 104 may transmit an acknowledgment to the PDSCH transmission. This may provide the base station 108 with an indication that the deactivation command has been successfully received by the UE 104.

At 352, the UE 104 and the base station 108 may engage in ongoing DL/UL traffic with the type 1 UL gap configuration deactivated. This may be similar to the ongoing DL/UL traffic described above with respect to 312.

In some embodiments, the fallback behavior of the UE 104 when a UL gap configuration is not activated may be based on one of the following two options. In a first option, the UE 104 may fall back to 3GPP release 16 behavior (for example, without performing BPS). In a second option, the UE 104 may autonomously find a gap to perform BPS or transceiver calibration. With this option, the base station 108 may have no, or limited, information about when the UE 104 is performing the BPS or transceiver calibration.

Figure 4:
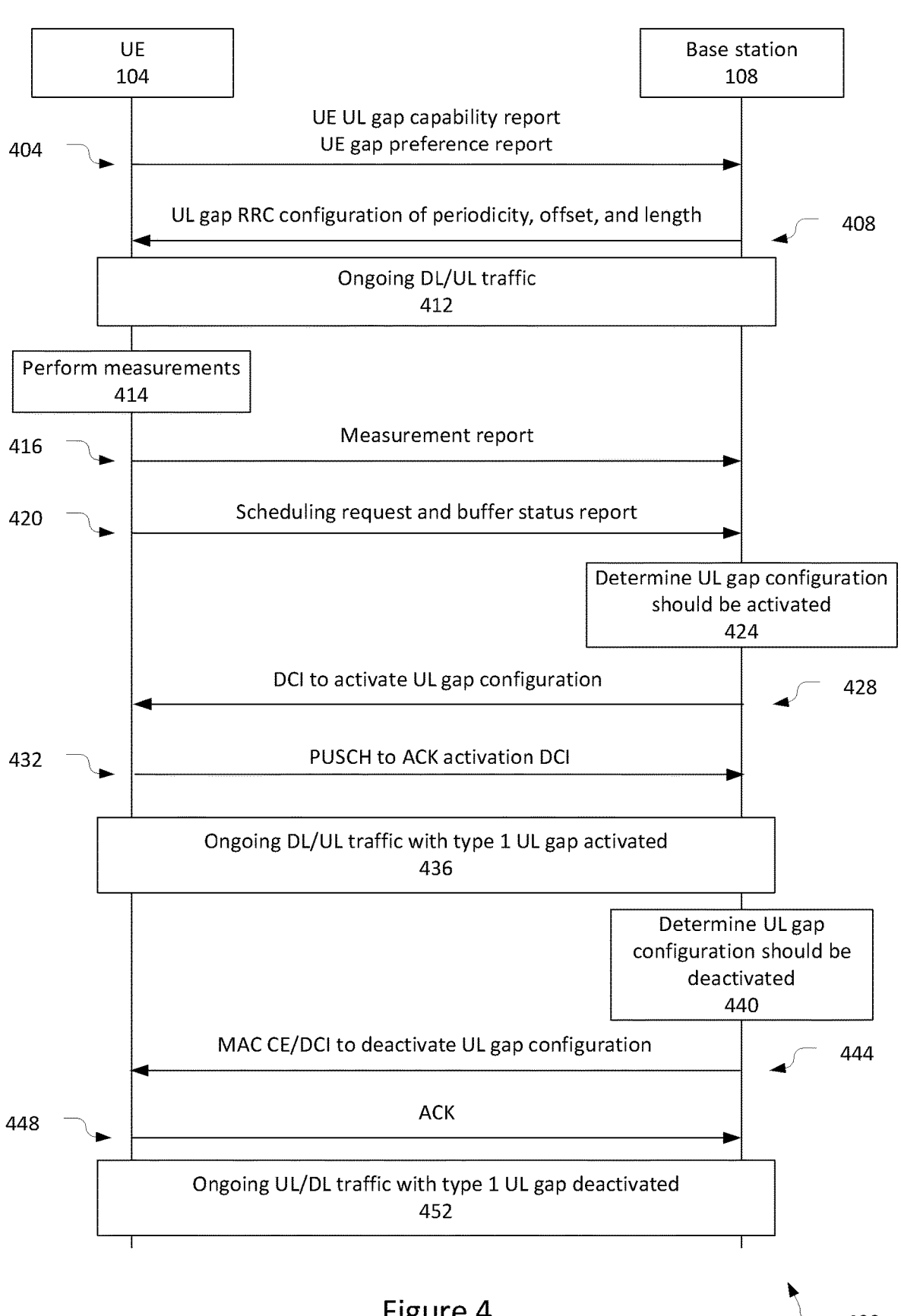
FIG. 4 is another message diagram that illustrates a network triggering activation of an uplink gap configuration in accordance with some embodiments.

FIG. 4 is a message diagram 400 between the UE 104 and the base station 108 that illustrates the network triggering a UL gap configuration using DCI in accordance with some embodiments.

The message diagram 400 includes operations and messages similar to like-named operations and messages described with respect to message diagram 300. However, instead of transmitting a MAC CE to activate a UL gap configuration, the UE 104 may transmit, at 428, DCI to activate the UL gap configuration. The activation DCI may be a scheduling DCI, for example, DCI format 0_1 or 0_2 that schedules a PUSCH transmission. Scheduling DCI may be used as the activation DCI given that the UL gap will typically be enabled with large amounts of UL traffic are expected. However, other embodiments may additionally/alternatively use non-scheduling DCI.

The activation DCI may include on additional bit that is used to enable UL gap activation. For example, the activation bit may be set to '1' to indicate activation and to '0' to indicate deactivation.

In embodiments in which more than one UL gap configuration is provided at 408, a plurality of UL gap configurations may be activated by using a bitmap in the activation DCI. Each bit of the bitmap may indicate whether a corresponding UL gap configuration is activated or deactivated.

If the UE 104 is configured with a plurality of UL gap configurations (config #), the DCI may include log 2 (config #) bits to trigger just one configuration at a time.

The UE may process the activation DCI and, at 432, transmit the scheduled PUSCH transmission. This may provide the base station 108 an indication that the activation command in the activation DCI was successfully received by the UE 104.

At 444, the base station 108 may deactivate the UL gap configuration by sending a MAC CE or DCI. If the base station 108 uses DCI to transmit the deactivation command, the DCI may be scheduling DCI (for example, DCI format 0_1 or 0_2) or non-scheduling DCI.

If the scheduling DCI is used to transmit the deactivation command, the base station 108 may send a scheduling DCI with a deactivation bit enabled for the last PUSCH scheduled before the BSR is zero.

A non-scheduling DCI used to deactivate the UL gap configuration may be similar to a semi-persistent scheduling (SPS) or configured grant (CG) type 2 deactivation/release. In some embodiments, the UE 104 may validate the deactivation command in the non-scheduling DCI in a manner similar to that described for PDCCH validation for DL SPS and UL grant type 2 in section 10.2 of 3GPP TS 38.213 v16.4.0 (2020-12). In some embodiments, the radio network temporary identifier (RNTI) used to scramble the cyclic redundancy check (CRC) bits of the non-scheduling DCI may be a cell-RNTI (C-RNTI) instead of a configured scheduling-RNTI (CS-RNTI), which is used for validating PDCCH that carries DL SPS assignment or configured UL grant Type 2. For example, the UE 104 may validate the deactivation command if: the CRC is scrambled with the CS-RNTI; a new data indicator field is set to '0'; and the DFI flag field, if present, is set to '0.'

At 448, the UE 104 may transmit an acknowledgment to indicate that the deactivation command was successfully received. The form of the acknowledgment may be based on the message used to transmit the deactivation command. For example, if a MAC CE is used to transmit the deactivation command, the acknowledgment may be an ACK used to acknowledge the PDSCH that includes the MAC CE. If a scheduling DCI is used to transmit the deactivation command, the UE 104 may transmit the PUSCH transmission scheduled by the scheduling DCI to acknowledge successful receipt of the deactivation command. If a non-scheduling DCI is used to transmit the deactivation command, the UE 104 may transmit an ACK consistent with a HARQ-ACK codebook generation procedure.

Figure 5:
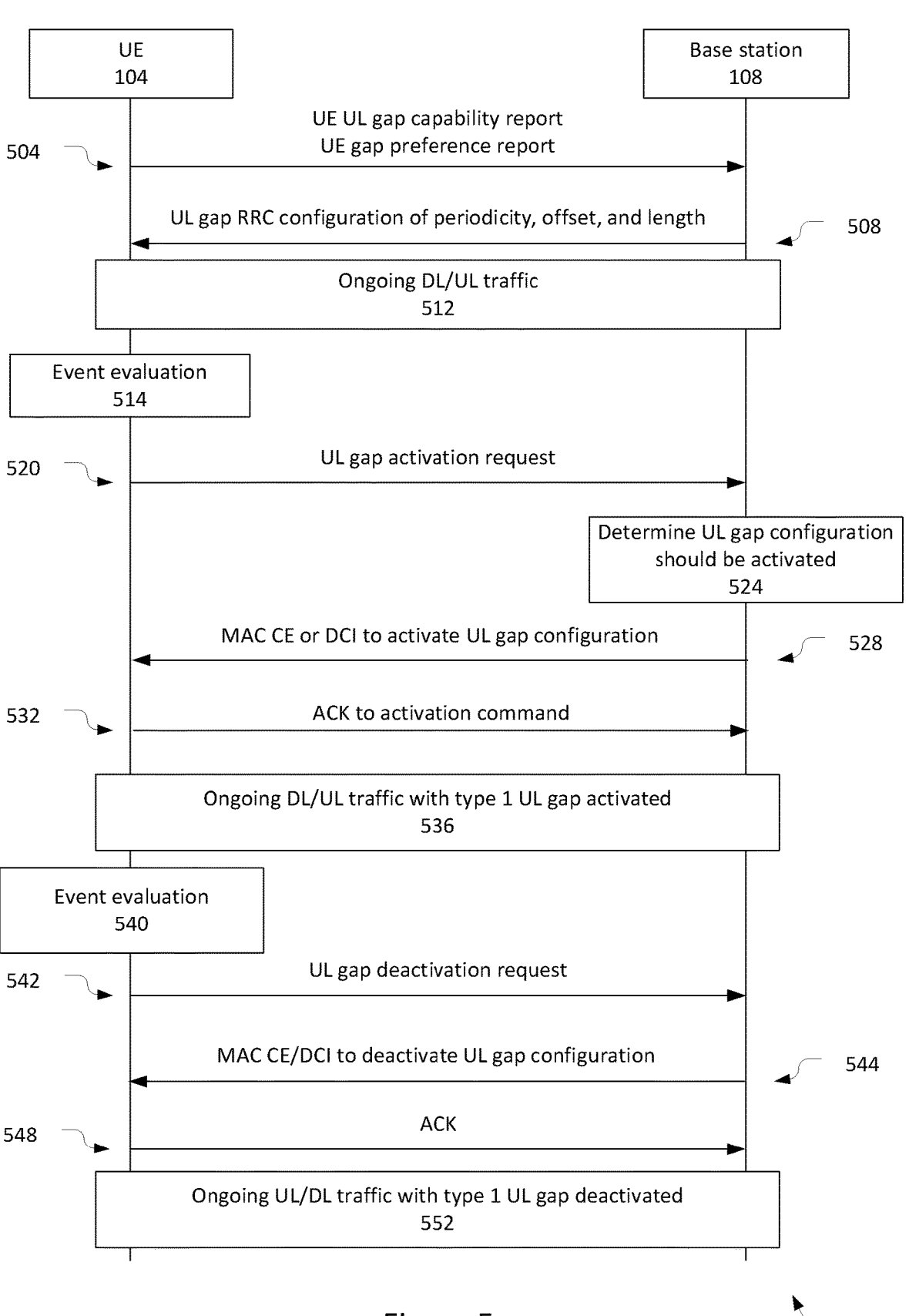
FIG. 5 is a message diagram that illustrates a UE triggering activation of an uplink gap configuration in accordance with some embodiments.

FIG. 5 is a message diagram 500 between the UE 104 and the base station 108 that illustrates a UE-detected event triggering activation of a UL gap configuration in accordance with some embodiments.

The message diagram 500 includes operations and messages similar to like-named operations and messages described with respect to message diagrams 300 and 400. However, in this embodiment, the UE 104 may initiate activation/deactivation of the UL gap configuration.

At 514, the UE 104 may perform an event evaluation to detect an event that triggers an activation operation. One or more of the following triggering events may be used as a basis for implementing the activation operation.

The triggering event may be when a P-MPR reduction is needed to meet MPE requirement. The UE 104 may determine that P-MPR reduction is needed based on a peak effective isotropic radiated power (EIRP) associated with uplink traffic, UL duty cycle, UL buffer status, link condition, and power control algorithm.

The triggering event may be a large temperature drift due to activities or environment of the UE 104. The level of the temperature drift, or the temperature of the UE itself, that is considered a triggering event may be defined by 3GPP TS or configured by the base station 108. In such instances, the UE 104 may request activation of a UL gap configuration to facilitate transceiver calibration.

If a triggering event is detected at the event evaluation 514, the UE 104 may transmit, at 520, a UL gap activation request. In some embodiments, the UL gap activation request may include information regarding intended usage of UL gaps (for example, BPS operation or transceiver calibration operation), identification of one or more specific UL gap configurations, or identification of a desired size or frequency of UL gaps.

The UL gap activation request may be transmitted by PUCCH transmission or a PUSCH transmission. If the UL gap activation request is to be transmitted by the PUSCH transmission, the UE 104 may use an existing PUSCH configuration through, for example, a configured grant or dynamic grant. In some embodiments, the activation request may be transmitted through a random access channel (RACH) transmission. For example, a RACH sequence pool may be partitioned to carry a dedicated UL gap activation request. Additionally/alternatively, RACH may be used as a scheduling request, with the activation request sent in a PUSCH transmission in the scheduled resources.

Upon receiving the UL gap activation request, the base station 108 may determine whether one or more UL gap configurations should be activated. The base station 108 may activate specific UL gap configurations identified in the UL gap activation request or other UL gap configurations that meet the desired objectives. For example, if the request includes an identification of a desired size or frequency of UL gaps, the base station 108 may select a combination of UL gap configurations that collectively provide the desired size or frequency.

At 528, the base station 108 may provide an activation command by transmitting a MAC CE or DCI to activate the selected UL gap configuration(s) and the UE 104 may acknowledge successful receipt of the activation command at 532 in a manner similar to that described with respect to FIG. 3 or FIG. 4.

After engaging in ongoing DL/UL traffic with type 1 UL gap activated at 536, the UE 104 may perform an event evaluation at 540 and determine that the trigger event is no longer present. For example, a P-MPR reduction is no longer needed to meet MPE, the temperature drift is below the threshold temperature drift, etc. Upon determining that the trigger event is no longer present, the UE 104 may transmit a UL gap deactivation request at 542. The UL gap deactivation request may identify one or more activated UL gap configurations for which deactivation is requested. The deactivation request may have a format similar to the activation request transmitted at 520.

Upon receiving the UL gap deactivation request, the base station 108 may transmit a deactivation command at 544. The deactivation command may be transmitted at 544 and acknowledged at 548 in manners similar to that described above with respect to FIG. 3 or FIG. 4.

In some embodiments, the network may provide one UL gap configuration for all usage scenarios such as, for example, BPS or transceiver calibration. The UE 104 may send the UL gap configuration preference per gap type. For example, the UE 104 may indicate a preference for a type 1 UL gap configuration for BPS and transceiver calibration; and may also indicate a preference for a type 2 UL gap configuration for PA calibration or coherent UL MIMO calibration.

The base station 108 may provide the UE 104 with one or more UL gap configurations per gap type. Thereafter, the base station 108 may activate/deactivate the one or more UL gap configurations. For example, the base station 108 may provide the UE 104 with first and second UL gap configurations for type 1 UL gaps for BPS or transceiver calibration and may provide the UE 104 with third and fourth UL gap configurations for type 2 UL gaps for PA calibration or coherent UL MIMO calibration. If the base station 108 intends to provide the UE 104 with a type 1 UL gap for BPS or transceiver calibration, it may send an activation command to activate either the first or the second UL gap configuration. Similarly, if the base station 108 intends to provide the UE 104 with a type 2 UL gap for PA calibration or coherent UL MIMO calibration, it may send an activation command to activate either the third or the fourth UL gap configuration.

In some embodiments, the UE 104 may send a UL gap configuration preference per usage case. For example, the UE 104 may transmit, in a preference report, an indication that it prefers a first UL gap configuration for a first usage case (for example, BPS) and a second UL gap configuration for a second usage case (for example, transceiver calibration). In response, the base station 108 may activate one or more UL gap configurations, which may correspond to the indicated preferred UL gap configurations or others.

Figure 7:
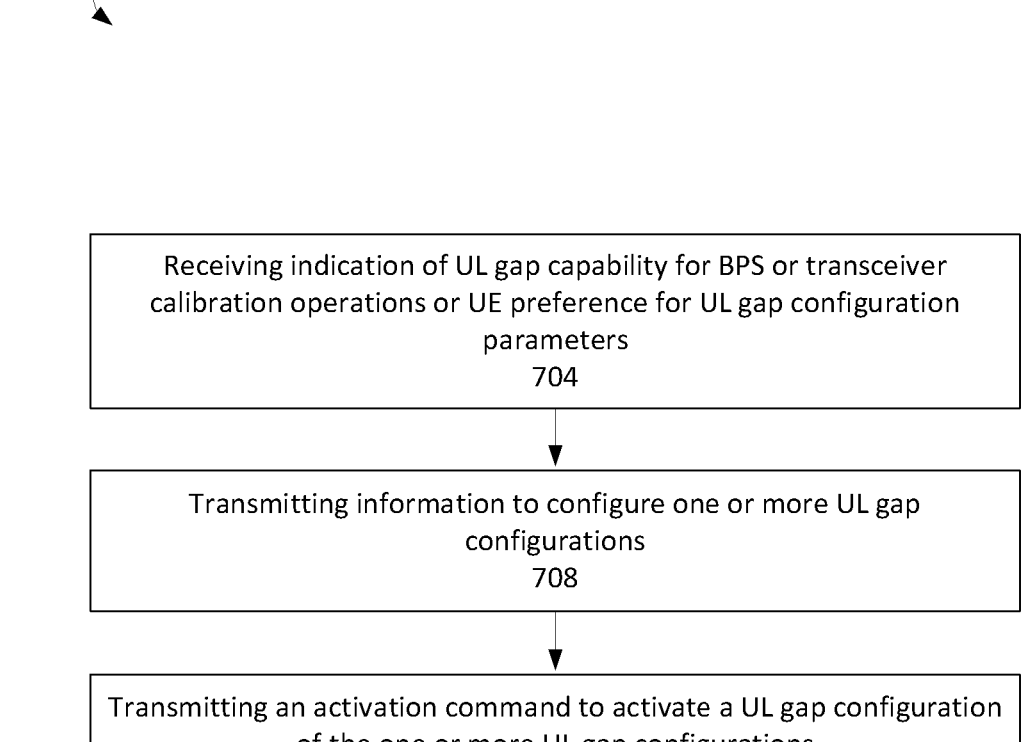
FIG. 7 illustrates another operational flow/algorithmic structure in accordance with some embodiments.
Figure 8:
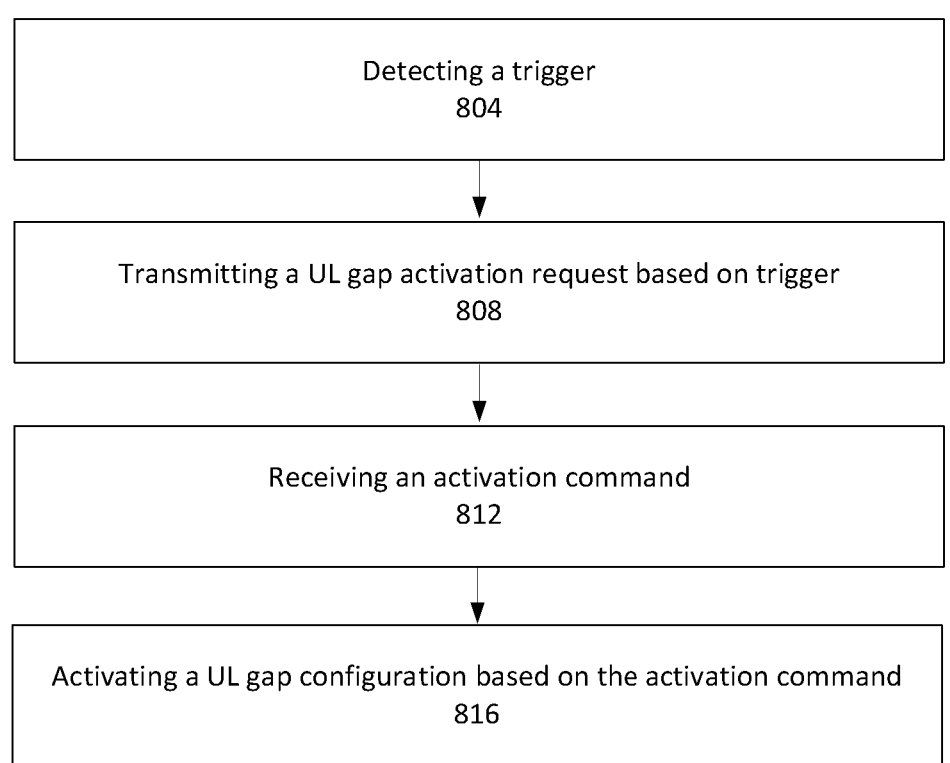
FIG. 8 illustrates another operational flow/algorithmic structure in accordance with some embodiments.

FIGS. 6-8 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

FIG. 6 illustrates an operational flow/algorithmic structure 600 in accordance with some embodiments. The operation flow/algorithmic structure 600 may be performed or implemented by a UE such as, for example, UE 104 or 900; or components thereof, for example, baseband processor circuitry 904A.

The operation flow/algorithmic structure 600 may include, at 604, transmitting indications of UE capability regarding uplink gaps for BPS or transceiver calibration, or UE preference for UL gap configuration parameters (for example, periodicity or length).

With respect to the capability, the UE may indicate whether it is capable of performing BPS/transceiver calibration operations within a UL gap and, if so, duration/periodicity needed to perform said operations.

With respect to the preference, the UE may indicate parameters that are desired in a UL gap configuration. The parameters may include, for example, periodicity, length, or gap type. In some embodiments, the preference may be transmitted after a plurality of UL gap configurations have been provided to the UE. In these embodiments, the preference may identify specific UL gap configurations. In some embodiments, specific preferred UL gap configurations may be identified for individual UL gap types.

Some embodiments may include transmitting either the UL gap capability or the UL gap preference. Other embodiments may include transmitting both the UL gap capability and the UL gap preference. In these embodiments, the UL gap capability and preference may be transmitted in the same message, or in different messages at different times.

The operation flow/algorithmic structure 600 may further include, at 608, receiving information to configure one or more UL gap configurations. The information may be transmitted by the base station using RRC signaling. Individual UL gap configurations may be associated with parameters such as periodicity, offset, and length. These parameters will define the presence and location of UL gaps when a corresponding UL gap configuration is activated. The information provided at 608 may be an initial list of UL gap configurations or an update to a previously configured list of UL gap configurations.

The operation flow/algorithmic structure 600 may further include, at 612, activating a UL gap configuration based on an activation command. Activating the UL gap configuration may include adjusting uplink and downlink operations to accommodate the UL gaps defined by the parameters of the UL gap configuration. The activation command may be a MAC CE or DCI transmission that identifies one or more of the UL gap configurations for which configuration information was provided at 608.

The activation command may be provided by the same base station that receives the UE capability/preference report and configures the UL gap configurations or another base station. For example, the UE may receive information to configure UL gap configurations from a first base station. If the UE is handed over to a second base station, the second base station may be the one that provides the activation command. A status of the UL gap configurations configured to a UE, as well as the capability/preferences associated with a particular UE, may be stored by the network in a UE context and transferred from the first base station to the second base station during the handover.

In some embodiments, the UE may provide an acknowledgment to the base station to acknowledge that it has successfully received the activation command. The format of the acknowledgment may be based on the format of the message that transmits the activation command as described elsewhere herein.

The operation flow/algorithmic structure 600 may further include, at 616, performing BPS or transceiver calibration operations within a UL gap defined by the activated UL gap configuration(s).

The UE may engage in ongoing uplink/downlink communications with the UL gap configuration(s) activated, performing BPS or transceiver calibration operations as needed/desired, until receiving a deactivation command from the network.

FIG. 7 illustrates an operation flow/algorithmic structure 700 in accordance with some embodiments. The operation flow/algorithmic structure 700 may be performed or implemented by a base station such as, for example, base station 108 or 1000; or components thereof, for example, baseband processor 1004A.

The operation flow/algorithmic structure 700 may include, at 704, receiving an indication of UL gap capability a UE for BPS or transceiver calibration operations or a UE preference for UL gap configuration parameters (for example, periodicity or length). The UL gap capability or preference may be received after the base station transmits a specific request for capability/preference or may be received as part of a (re)connection process. The UL gap capability/preference may include content similar to that described elsewhere herein and may be transmitted in similar manners.

The operation flow/algorithmic structure 700 may further include, at 708, transmitting information to configure one or more UL gap configurations. In some embodiments, one or more UL gap configurations may be provided for specific gap types/purposes. The one or more UL gap configurations provided to the UE may be based on capability/preference information received from the UE at 704. In other embodiments, the UL gap configurations provided to the UE may not necessarily be specifically tailored to the capabilities or preferences of the UE.

The operation flow/algorithmic structure 700 may further include, at 712, transmitting an activation command to activate a UL gap configuration of the one or more UL gap configurations. Transmission of the activation command may be triggered by measurement/BSR/power management reports received from the UE. The base station may detect a trigger condition at the UE based on these reports. The trigger condition may be a condition in which the UE has a high-probability of needing an UL gap to perform BPS/transceiver calibration operation. For example, the trigger condition may be that the UE is at a cell-edge, is in or expected to enter a high-traffic state, or is reducing transmit power to comply with emission restrictions.

In some embodiments, the trigger condition detected by the base station may be an activation request received from the UE. For example, the UE may detect the condition in which it has a high probability of needing a UL gap and may send the activation request to the base station.

The activation command may be transmitted by a MAC CE or DCI communication. The activation command may identify one UL gap configuration or a plurality of UL gap configurations.

The base station may select the UL gap configuration(s) to activate based on capability/preference information received from the UE at 704. In some embodiments, the base station may select the UL gap configuration(s) additionally/alternatively based on information (for example, usage information) received in an activation request.

FIG. 8 illustrates an operational flow/algorithmic structure 800 in accordance with some embodiments. The operation flow/algorithmic structure 800 may be performed or implemented by a UE such as, for example, UE 104 or 900; or components thereof, for example, baseband processor circuitry 904A.

The operation flow/algorithmic structure 800 may include, at 804, detecting a trigger. The trigger may be indicative of the condition in which the UE would benefit from a UL gap to perform BPS/transceiver calibration operations. The conditions may relate to the UE being at a cell-edge (or otherwise experiencing compromised signal quality); being in or expecting to enter a high-traffic state; or having to reducing transmit power to comply with emission restrictions. The conditions may be detected by monitoring measurements performed at the UE, a buffer status at the UE, etc. In some embodiments, the trigger may be based on a determination that P-MPR reduction is needed to meet MPE; a temperature of the UE has increased beyond a predetermined threshold; or channel conditions have decreased below a predetermined threshold.

The operation flow/algorithmic structure 800 may further include, at 808, transmitting a UL gap activation request based on the trigger. The UL gap activation request may be transmitted in a PUCCH transmission or a PUSCH transmission. If the UE is to use a PUSCH transmission, it may identify uplink resources for the transmission based on a configured grant or a dynamic grant.

The operation flow/algorithmic structure 800 may further include, at 812, receiving an activation command. The activation command may be received in a MAC CE or DCI transmission. In some embodiments, the UE may transmit an acknowledgment to the base station to provide an indication that the activation command was successfully received by the UE.

The operation flow/algorithmic structure 800 may further include, at 816, activating a UL gap configuration based on the activation command. After activating the UL gap configuration, the UE may perform BPS/transceiver calibration operations in a UL gap defined by the UL gap configuration. The UE may continue with UL/DL traffic with the UL gap configuration activated until receiving a deactivation command from the base station.

Figure 9:
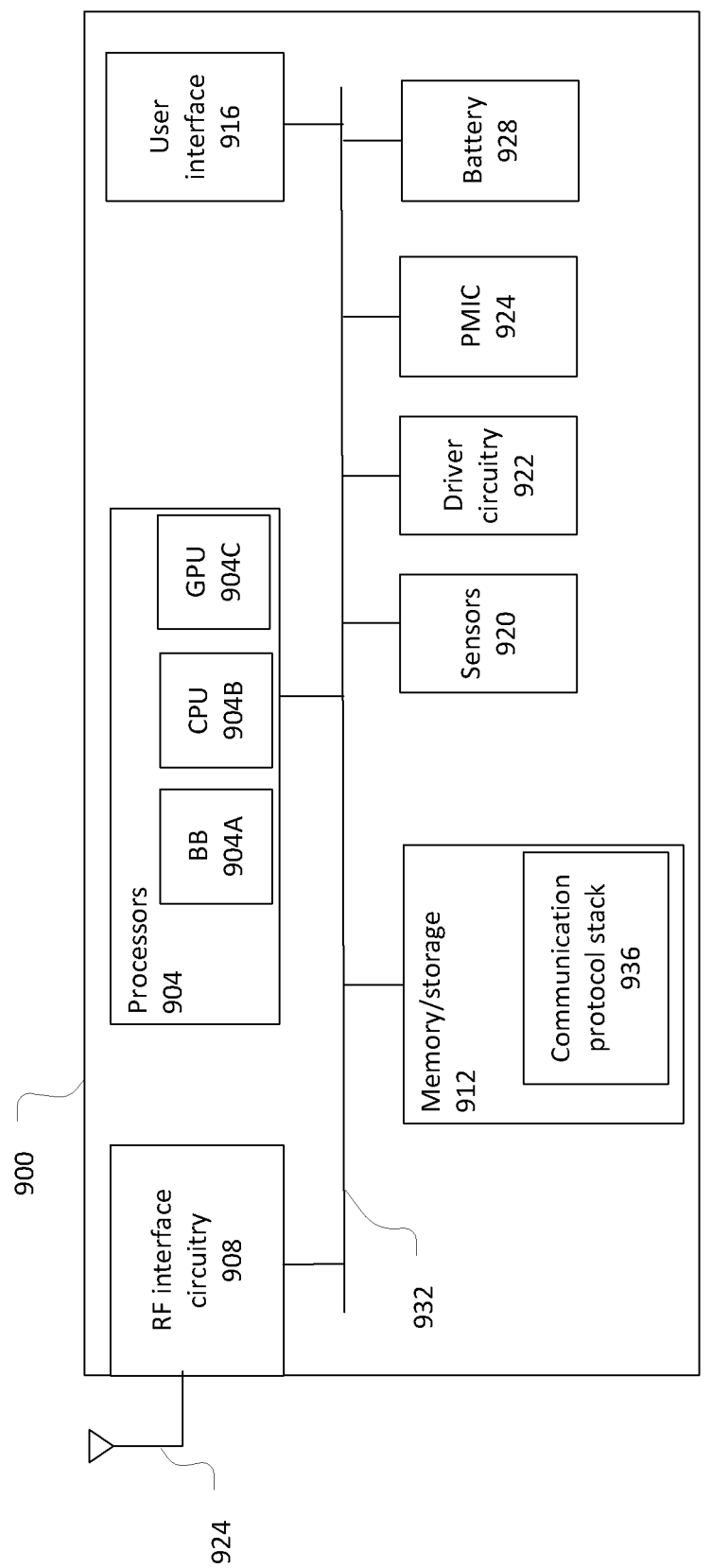
FIG. 9 illustrates a user equipment in accordance with some embodiments.

FIG. 9 illustrates a UE 900 in accordance with some embodiments. The UE 900 may be similar to and substantially interchangeable with UE 104.

The UE 900 may be any mobile or non-mobile computing device, such as, for example, a mobile phone, computer, tablet, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, a video camera), wearable device (for example, a smart watch), or Internet-of-things device.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 may also store UL gap configuration parameters and capability/preference information as described elsewhere.

The memory/storage 912 include any type of volatile or non-volatile memory that may be distributed throughout the UE 900. In some embodiments, some of the memory/storage

912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, or phased array antennas. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, for example, one or more physical or virtual buttons (for example, a reset button), a physical keyboard, keypad, mouse, touchpad, touchscreen, microphones, scanner, or headset. The output device circuitry includes any physical or virtual means for showing information or otherwise conveying information, such as sensor readings, actuator position(s), or other like information. Output device circuitry may include any number or combinations of audio or visual display, including, for example, one or more simple visual outputs/indicators (for example, binary status indicators such as light emitting diodes (LEDs) and multi-character visual outputs), or more complex outputs such as display devices or touchscreens (for example, liquid crystal displays (LCDs), LED displays, quantum dot displays, or projectors)

with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include: a display driver to control and allow access to a display device; a touchscreen driver to control and allow access to a touchscreen interface; sensor drivers to obtain sensor readings of sensor circuitry 920 and control and allow access to sensor circuitry 920; drivers to obtain actuator positions of electro-mechanic components or control and allow access to the electro-mechanic components; a camera driver to control and allow access to an embedded image capture device; and audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

A battery 928 may power the UE 900, although in some examples the UE 900 may be mounted deployed in a fixed location, and may have a power supply coupled to an electrical grid. The battery 928 may be a lithium-ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
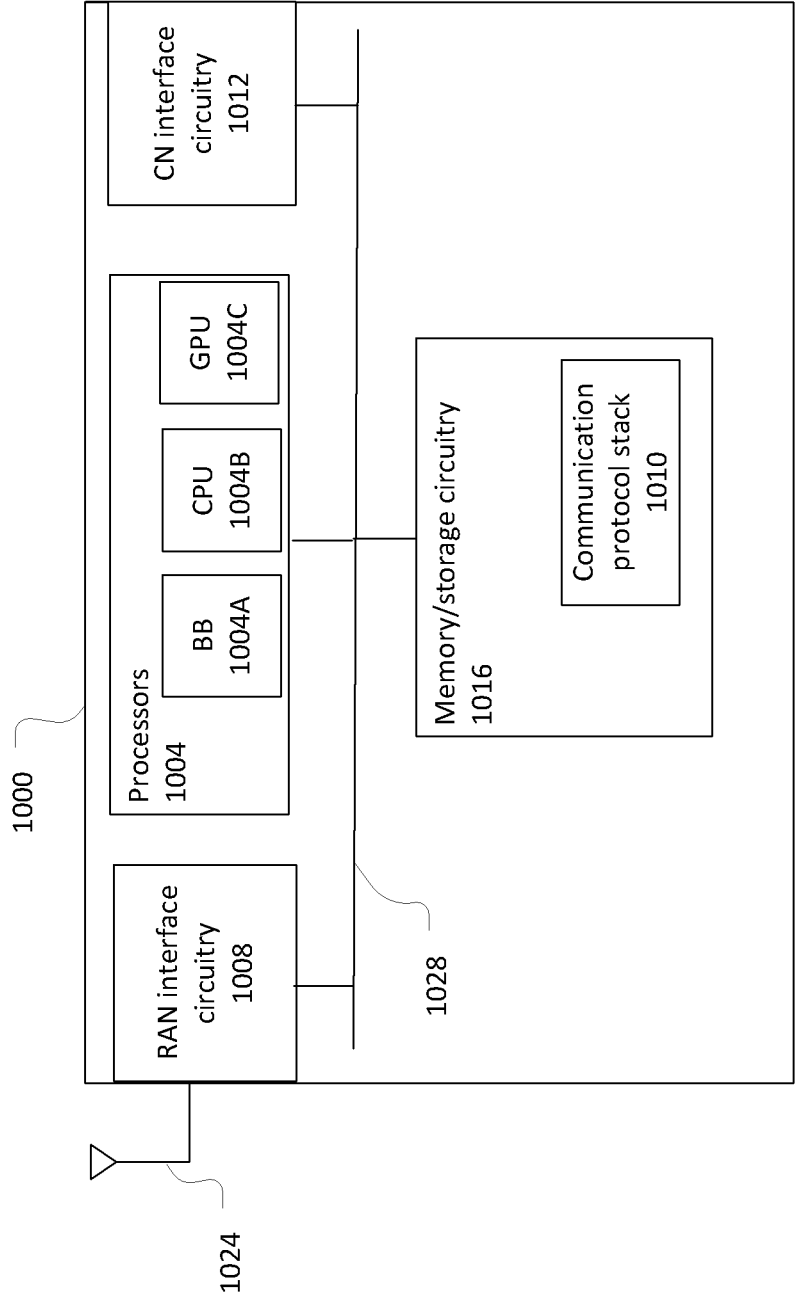
FIG. 10 illustrates a base station in accordance with some embodiments.

FIG. 10 illustrates a base station 1000 in accordance with some embodiments. The base station 1000 may be similar to and substantially interchangeable with base station 108.

The base station 1000 may include processors 1004, RF interface circuitry 1008, core network (CN) interface circuitry 1012, memory/storage circuitry 1016, and antenna structure 1026.

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a 5th Generation Core network (5GC) using a 5GC-compatible network interface protocol such as carrier Ethernet protocols, or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes method of operating a user equipment (UE), the method comprising: transmitting, to a base station, an indication of an uplink (UL) gap capability or preference of the UE for body proximity sensing (BPS) or transceiver calibration; activating a UL gap configuration based on an activation command received from a network; and performing operations for BPS or transceiver calibration within a UL gap defined by the UL gap configuration.

Example 2 includes the method of example 1 or some other example herein, the method further comprising: receiving the activation command in a media access control (MAC) control element (CE) or downlink control information (DCI).

Example 3 includes the method of example 2 or some other example herein, wherein the activation command is received in a MAC CE and the method further comprises: transmitting, to the base station, an acknowledgment of a physical downlink shared channel transmission that conveys the MAC CE to acknowledge receipt of the activation command.

Example 4 includes the method of example 2 or some other example herein, wherein the activation command is received in DCI and the method further comprises: transmitting, to the base station, a physical uplink shared channel transmission scheduled by the DCI to acknowledge receipt of the activation command.

Example 5 includes the method of example 1 or some other example herein, the method further comprising: deactivating the UL gap configuration based on a deactivation command received from the network.

Example 6 includes the method of example 5 or some other example herein, the method further comprising: receiving the deactivation command in a media access control (MAC) control element (CE) of a physical downlink shared channel (PDSCH) transmission; and transmitting, to the base station, an acknowledgment of the PDSCH transmission to indicate the deactivation command was successfully received.

Example 7 includes the method of example 5 or some other example herein, further comprising: receiving the deactivation command in downlink control information (DCI) that schedules a physical uplink shared channel (PUSCH) transmission; and transmitting, to the base station, the PUSCH transmission to indicate the deactivation command was successfully received.

Example 8 includes the method of example 5 or some other example herein, further comprising: receiving the deactivation command in downlink control information (DCI) that does not schedule a physical uplink shared channel (PUSCH) transmission; and transmitting, to the base station, a hybrid automatic repeat request (HARQ) acknowledgement to indicate the deactivation command was successfully received.

Example 9 includes the method of example 1 or some other example herein, wherein the method further comprises: receiving, from the base station, radio resource control (RRC) signaling to configure parameters of the UL gap configuration, the parameters to include UL gap periodicity, length, or offset.

Example 10 includes the method of example 9 or some other example herein, wherein the parameters include a periodicity (ULgap_periodicity) and offset (ULgapStartOffset) that are defined in milliseconds, wherein the UL gap is to start at a subframe with a subframe number that meets a condition: $((SFN*10)+\text{subframe number}] \bmod (\text{ULgap\_periodicity})=(\text{ULgapStartOffset}) \bmod (\text{ULgap\_periodicity})$, where SFN is a system frame number.

Example 11 includes the method of example 9 or some other example herein, wherein the parameters include a periodicity (ULgap_periodicity) and offset (ULgapStartOffset) that are defined in slots, wherein the UL gap within a subframe with a subframe number is to start at a slot with a slot index (slotIndex) that meets a condition: $((SFN*10)+\text{subframe number})*8+(\text{slotIndex within subframe})] \bmod (\text{ULgap\_periodicity})=(\text{ULgapStartOffset}) \bmod (\text{ULgap\_periodicity})$, where SFN is a system frame number.

Example 12 includes the method of example 9 or some other example herein, wherein the parameters include a length that is defined as a number of consecutive uplink slots, wherein the number is 1, 2, 4, or 8.

Example 13 includes the method of example 9 or some other example herein, wherein the parameters include an UL gap periodicity that is 20, 40, 80, or 160 milliseconds.

Example 14 includes method of operating a base station, the method comprising: receiving, from a user equipment (UE), an indication of an uplink (UL) gap capability regarding uplink gaps for body proximity sensing (BPS) or transceiver calibration operations or an indication of a UE preference for UL gap configuration parameters; transmitting, to the UE, information to configure one or more UL gap configurations based on the indication of the UL gap capability or UE preference; and transmitting, to the UE, an activation command to activate a UL gap configuration of the one or more UL gap configurations.

Example 15 includes the method of example 14 or some other example herein, further comprising: receiving a measurement report from the UE; detecting a cell edge condition based on the measurement report; and transmitting the activation command based on said detecting of the cell edge condition.

Example 16 includes the method of example 14 or some other example herein, further comprising: receiving a buffer status report from the UE; detecting a traffic condition at the UE based on the buffer status report; and transmitting the activation command based on said detecting of the traffic condition.

Example 17 includes the method of example 14 or some other example herein, further comprising: receiving a power management-maximum power reduction (P-MPR) report from the UE; detecting a power condition at the UE based on the P-MPR report; and transmitting the activation command based on said detecting of the power condition.

Example 18 includes the method of example 14 or some other example herein, further comprising: transmitting the activation command in a media access control (MAC) control element (CE) or downlink control information (DCI).

Example 19 includes the method of example 18 or some other example herein, wherein the activation command is transmitted in a MAC CE and the method further comprises: receiving, from the UE, an acknowledgment of a physical downlink shared channel transmission that conveys the MAC CE; and determining the activation command was successfully received by the UE based on the acknowledgment.

Example 20 includes the method of example 18 or some other example herein, wherein the activation command is transmitted by one or more bits in DCI that schedules a physical uplink shared channel (PUSCH) transmission.

Example 21 includes the method of example 20 or some other example herein, wherein the method further comprises: receiving, from the UE, the PUSCH transmission; and determining the activation command was successfully received by the UE based on said receiving of the PUSCH transmission.

Example 22 includes the method of example 18 or some other example herein, wherein the activation command is transmitted by one or more bits in DCI that does not schedule a physical uplink shared channel (PUSCH) transmission and the method further comprises: scrambling cyclic redundancy check (CRC) bits of the DCI with a cell-radio network temporary identifier (C-RNTI).

Example 23 includes the method of example 14 or some other example herein, further comprising: transmitting the activation command to activate a plurality of UL gap configurations that include the UL gap configuration.

Example 24 includes the method of example 10 or some other example herein, wherein the one or more UL gap configurations are for a first gap type and the method further comprises: transmitting, to the UE, information to configure a second one or more UL gap configurations for a second gap type.

Example 25 includes method of operating a user equipment (UE), the method comprising: detecting a trigger; transmitting, to a base station, an uplink (UL) gap activation request based on said detecting of the trigger; receiving an activation command; and activating a UL gap configuration based on the activation command.

Example 26 includes the method of example 25 or some other example herein, further comprising: detecting the trigger based on a determination that power management maximum power reduction (P-MPR) is required to meet maximum permissible exposure (MPE) requirements.

Example 27 includes the method of example 25 or some other example herein, further comprising: determining that P-MPR is required to meet MPE requirements based on a peak effective isotropic radiated power (EIRP) associated with uplink traffic, a UL duty cycle, a UL buffer status, a link condition, or a power control algorithm.

Example 28 includes the method of example 25 or some other example herein, further comprising: determining that a temperature of the UE is greater than a predetermined threshold; and detecting the trigger based on said determining that the temperature is greater than the predetermined threshold.

Example 29 includes the method of example 25 or some other example herein, further comprising: transmitting the UL gap activation request in a physical uplink control channel (PUCCH) transmission.

Example 30 includes the method of example 25 or some other example herein, further comprising: transmitting the UL gap activation request in a physical uplink shared channel (PUSCH) transmission.

Example 31 includes the method of example 30 or some other example herein, further comprising: identifying uplink resources based on a configured grant or dynamic grant; and transmitting the PUSCH transmission in the uplink resources.

Example 32 may include an apparatus comprising means to perform one or more elements of a method described in or related to any of examples 1-31, or any other method or process described herein.

Example 33 may include one or more non-transitory computer-readable media comprising instructions to cause an electronic device, upon execution of the instructions by one or more processors of the electronic device, to perform one or more elements of a method described in or related to any of examples 1-31, or any other method or process described herein.

Example 34 may include an apparatus comprising logic, modules, or circuitry to perform one or more elements of a method described in or related to any of examples 1-31, or any other method or process described herein.

Example 35 may include a method, technique, or process as described in or related to any of examples 1-31, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of examples 1-31, or portions thereof.

Example 37 may include a signal as described in or related to any of examples 1-31, or portions or parts thereof.

Example 38 may include a datagram, information element, packet, frame, segment, PDU, or message as described in or related to any of examples 1-31, or portions or parts thereof, or otherwise described in the present disclosure.

Example 39 may include a signal encoded with data as described in or related to any of examples 1-31, or portions or parts thereof, or otherwise described in the present disclosure.

Example 40 may include a signal encoded with a datagram, IE, packet, frame, segment, PDU, or message as described in or related to any of examples 1-31, or portions or parts thereof, or otherwise described in the present disclosure.

Example 41 may include an electromagnetic signal carrying computer-readable instructions, wherein execution of the computer-readable instructions by one or more processors is to cause the one or more processors to perform the method, techniques, or process as described in or related to any of examples 1-31, or portions thereof.

Example 42 may include a computer program comprising instructions, wherein execution of the program by a processing element is to cause the processing element to carry out the method, techniques, or process as described in or related to any of examples 1-31, or portions thereof.

Example 43 may include a signal in a wireless network as shown and described herein.

Example 44 may include a method of communicating in a wireless network as shown and described herein.

Example 45 may include a system for providing wireless communication as shown and described herein.

Example 46 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

generating an uplink (UL) gap preference report to be transmitted to a base station, wherein the UL gap preference report includes an indication of a gap periodicity and a gap length that are preferred for a UL gap configuration associated with a frequency range 2 (FR2) UL gap;

generating a UL gap capability report to indicate a capability to perform body proximity sensing (BPS) within the FR2 UL gap;

activating the UL gap configuration based on an activation command received from a network; and performing BPS operation in accordance with the UL gap configuration.

2. The method of claim 1, further comprising:

processing the activation command in a media access control (MAC) control element (CE) or downlink control information (DCI).

3. The method of claim 2, wherein the activation command is received in a MAC CE and the method further comprises:

generating an acknowledgment of a physical downlink shared channel transmission, to be transmitted to the base station, that conveys the MAC CE to acknowledge receipt of the activation command.

4. The method of claim 2, wherein the activation command is received in DCI and the method further comprises:

generating a physical uplink shared channel transmission scheduled by the DCI, to be transmitted to the base station, to acknowledge receipt of the activation command.

5. The method of claim 1, further comprising:

deactivating the UL gap configuration based on a deactivation command received from the network.

6. The method of claim 5, further comprising:

processing the deactivation command in downlink control information (DCI) that schedules a physical uplink shared channel (PUSCH) transmission; and generating the PUSCH transmission, to be transmitted to the base station, to indicate the deactivation command was successfully received.

7. The method of claim 5, further comprising:

processing the deactivation command in downlink control information (DCI) that does not schedule a physical uplink shared channel (PUSCH) transmission; and generating a hybrid automatic repeat request (HARQ) acknowledgement, to be transmitted to the base station, to indicate the deactivation command was successfully received.

8. The method of claim 1, wherein the method further comprises:

processing a radio resource control (RRC) signaling, received from the base station, to indicate configured parameters of the UL gap configuration, the parameters to include UL gap periodicity, length, or offset.

9. The method of claim 8, wherein the configured parameters include a periodicity (ULgap_periodicity) and offset (ULgapStartOffset) that are defined in milliseconds, wherein the UL gap is to start at a subframe with a subframe number that meets a condition: ((SFN* 10) +subframe number) mod (ULgap_periodicity) =(ULgapStartOffset) mod (ULgap__periodicity), where SFN is a system frame number.

10. The method of claim 8, wherein the configured parameters include a periodicity (ULgap_periodicity) and offset (ULgapStartOffset) that are defined in slots, wherein the UL gap within a subframe with a subframe number is to start at a slot with a slot index (slotIndex) that meets a condition: ((SFN* 10) +subframe number) * 8 + (slotIndex within subframe)) mod (ULgap_periodicity) =(ULgapStartOffset) mod (ULgap_periodicity), where SFN is a system frame number.

11. The method of claim 8, wherein the parameters include a length that is defined as a number of consecutive uplink slots, wherein the number is 1, 2, 4, or 8.

12. The method of claim 8, wherein the parameters include a UL gap periodicity that is 20, 40, 80, or 160 milliseconds.

13. The method of claim 1, further comprising:

performing a transceiver calibration in accordance with the UL gap configuration.

14. The method of claim 1, wherein the UL gap preference report indicates a UL gap pattern that is preferred among a plurality of UL gap patterns.

15. The method of claim 1, wherein the FR2 UL gap is configured without a UL grant during the FR2 UL gap.

16. One or more non-transitory computer-readable media having instructions that, when executed, cause processing circuitry to:

process an uplink (UL) gap preference report received from a user equipment (UE), wherein the UL gap preference report includes an indication of a gap periodicity and a gap length that are preferred for a UL gap configuration in frequency range 2 (FR2);

generate information based on the UL gap preference report, the information to be transmitted to the UE to configure one or more UL gap configurations;

process a request to activate a UL gap configuration of the one or more UL gap configurations; and

generate, based on the request, an activation command, to be transmitted to the UE, to activate the UL gap configuration of the one or more UL gap configurations.

17. The one or more non-transitory computer-readable media of claim 16, wherein the instructions, when executed, further cause the processing circuitry to:

process a measurement report from the UE;

detect a cell edge condition based on the measurement report; and generate the activation command based on detection of the cell edge condition.

18. The one or more non-transitory computer-readable media of claim 16, wherein the instructions, when executed, further cause the processing circuitry to:

process a buffer status report from the UE;

detect a traffic condition at the UE based on the buffer status report; and generate the activation command based on detection of the traffic condition.

19. The one or more non-transitory computer-readable media of claim 16, wherein the instructions, when executed, further cause the processing circuitry to:

process a power management-maximum power reduction (P-MPR) report from the UE;

detect a power condition at the UE based on the P-MPR report; and generate the activation command based on detection of the power condition.

20. The one or more non-transitory computer-readable media of claim 16, wherein the UL gap configuration is for a body proximity sensing (BPS) operation of the UE.

21. An apparatus comprising:

processing circuitry to:

generate an uplink (UL) gap preference report to be transmitted to a base station, wherein the UL gap preference report includes an indication of a gap periodicity and a gap length that are preferred for a UL gap configuration associated with a frequency range 2 (FR2) UL gap;

generate a UL gap capability report to indicate a capability to perform body proximity sensing (BPS) within the FR2 UL gap; and activate the UL gap configuration based on an activation command received from a network; and perform a BPS operation in accordance with the UL gap configuration; and interface circuitry coupled with the processing circuitry to enable communication.

22. The apparatus of claim 21, wherein the processing circuitry is further to:

process the activation command in a media access control (MAC) control element (CE) or downlink control information (DCI).

23. The apparatus of claim 22, wherein the activation command is received in a MAC CE and the processing circuitry is further to:

generate an acknowledgment of a physical downlink shared channel transmission, to be transmitted to the base station, that conveys the MAC CE to acknowledge receipt of the activation command.

24. The apparatus of claim 22, wherein the activation command is received in DCI and the processing circuitry is further to:

generate a physical uplink shared channel transmission, to be transmitted to the base station, scheduled by the DCI to acknowledge receipt of the activation command.

25. The apparatus of claim 21, wherein the processing circuitry is further to:

deactivate the UL gap configuration based on a deactivation command received from the network.

26. The apparatus of claim 25, wherein the processing circuitry is further to:

process the deactivation command in a media access control (MAC) control element (CE) of a physical downlink shared channel (PDSCH) transmission; and generate an acknowledgment of the PDSCH transmission, to be transmitted to the base station, to indicate the deactivation command was successfully received.

27. The apparatus of claim 21, wherein the processing circuitry is further to:

process radio resource control (RRC) signaling, received from the base station, to configure parameters of the UL gap configuration, the parameters to include UL gap periodicity, length, or offset.

28. The apparatus of claim 21, wherein the UL gap preference report indicates a UL gap pattern that is preferred among a plurality of UL gap patterns.

* * * * *